(No Model.)
W. MOORE.
BRAKE LEVER.
No. 271,099. Patented Jan. 23, 1883.
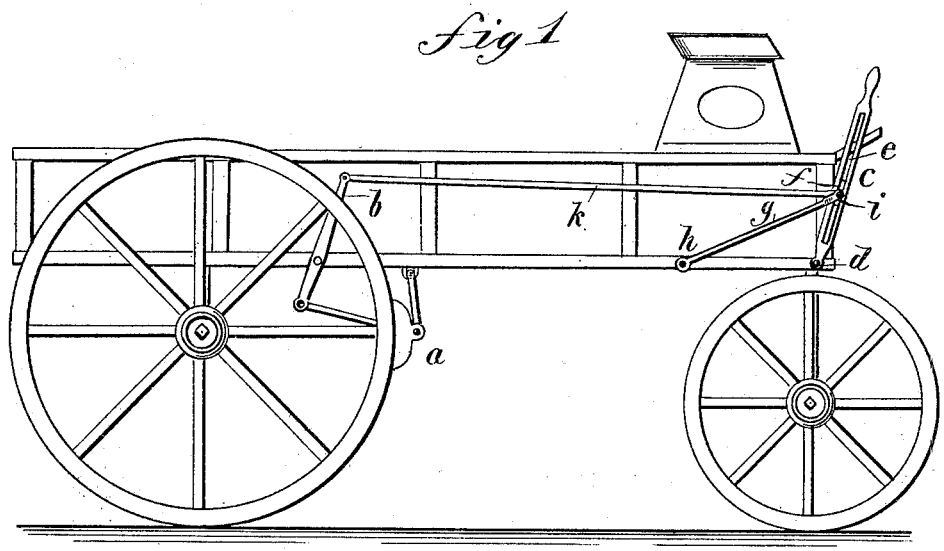
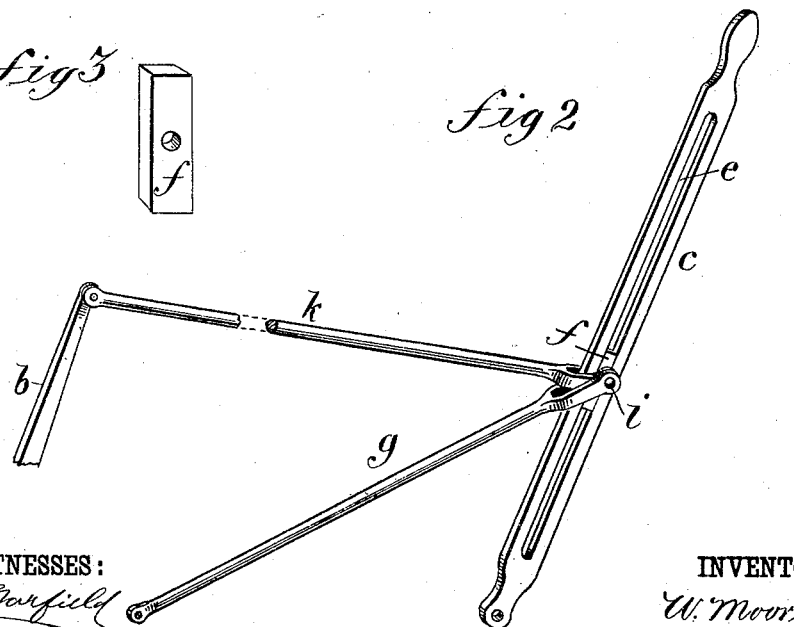
WITNESSES:
INVENTOR:
W. Moore
BY Munn & Co.
ATTORNEYS.

UNITED STATES PATENT OFFICE.

WILLIAM MOORE, OF CLEAR SPRING, INDIANA.

BRAKE-LEVER.

SPECIFICATION forming part of Letters Patent No. 271,099, dated January 23, 1883.

Application filed October 18, 1882. (No model.)

*To all whom it may concern:*

Be it known that I, WILLIAM MOORE, of Clear Spring, in the county of Jackson and State of Indiana, have invented a new and Improved Brake-Lever, of which the following is a full, clear, and exact description.

My invention consists in an improved brake-lever for use with wagon-brakes, having the object to secure great power when the brake is applied and a greater extent of movement of the brake-shoes when released from the wheel, as hereinafter described and claimed.

Reference is to be had to the accompanying drawings, forming a part of this specification, in which similar letters of reference indicate corresponding parts in all the figures.

Figure 1 is a side elevation of a wagon provided with my improved brake mechanism. Fig. 2 is a perspective view of the brake-lever. Fig. 3 shows the slide detached.

The suspended brake-shoe $a$ and the lever $b$, connected therewith, are of ordinary construction and arrangement, and may be fitted in any suitable manner.

$c$ is the brake-lever, hung on the pin $d$ at its lower end, and formed lengthwise with a slot, $e$.

$f$ is a slide fitted in the slot $e$ for movement therein.

$g$ is a rod or link fixed at one end by a pivot, $h$, and forked at its other end to pass at opposite sides of the lever $c$, and connected to the slide $f$ by a cross-pin, $i$.

$k$ is a rod, also forked at one end, and connected to the slide $f$ by the pin $i$, and extending to the lever $b$, to which the rod is also connected.

In the operation of the brakes, when the lever $c$ is moved backward the rod $g$ causes the slide $f$ to run upward in the slot $e$, so that the rod $k$ and lever $b$ are moved to the extent required for throwing the brake-shoes entirely free from the wheels. When the lever is moved forward to apply the brakes the slide $f$ moves downward in the slot $e$, and the power by which the brakes are applied thus gradually increases by the increased leverage, so that the brakes can be applied with great power that increases the tighter they are locked. A comparatively limited extent of movement thus effects the clearing of the brake-shoes entirely from the wheels, as the slide moves rapidly to the outer end of the lever as soon as the lever is moved. The lever may be fitted for operation by either hand or foot.

I am aware that it is not new in brake mechanism to connect an arm of the brake-shaft with the hand lever by a rod having an end sleeve which slides on the hand-lever in order that the leverage may increase as the resistance increases; but

What I claim as new and of my invention is—

The slotted lever $c$, combined with a slide-block, $f$, carrying pivot $i$, and the brake-lever rod $k$, turning on said block-pivot, as and for the purpose specified.

WILLIAM MOORE.

Witnesses:
 GEORGE W. MAY,
 HENRY H. PAYNE.